US012633549B2

(12) United States Patent
Choi et al.

(10) Patent No.: US 12,633,549 B2
(45) Date of Patent: May 19, 2026

(54) SEPARATOR FOR FUEL CELL

(71) Applicants: Hyundai Motor Company, Seoul
(KR); Kia Corporation, Seoul (KR)

(72) Inventors: Jae Hyeon Choi, Incheon (KR);
Kyeong Min Kim, Namyangju-si (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 573 days.

(21) Appl. No.: 18/118,457

(22) Filed: Mar. 7, 2023

(65) Prior Publication Data

US 2024/0079609 A1 Mar. 7, 2024

(30) Foreign Application Priority Data

Sep. 5, 2022 (KR) ........................ 10-2022-0112196

(51) Int. Cl.
H01M 8/0258 (2016.01)
H01M 8/10 (2016.01)
(52) U.S. Cl.
CPC .. H01M 8/0258 (2013.01); H01M 2008/1095
(2013.01)

(58) Field of Classification Search
CPC ....... H01M 8/0258; H01M 2008/1095; H01M
8/0265; H01M 8/0254; H01M 8/026;
H01M 8/0267; Y02E 60/50
See application file for complete search history.

(56) References Cited

U.S. PATENT DOCUMENTS

2015/0200414 A1* 7/2015 Nagumo ............... H01M 8/026
429/455

FOREIGN PATENT DOCUMENTS

JP 61-84879 B2 8/2017

* cited by examiner

*Primary Examiner* — Adam A Arciero
(74) *Attorney, Agent, or Firm* — Banner & Witcoff, Ltd.

(57) ABSTRACT

A separator for a fuel cell includes a reaction region, a pair
of manifold regions on opposite sides of the reaction region
and through which a plurality of manifolds pass, configured
to introduce or discharge reaction gas or coolant, and a pair
of diffusion regions between the reaction region and the
manifold regions, configured to diffuse a flow of the reaction
gas or coolant. Diffusion ribs in the diffusion regions are
spaced apart from each other along the manifolds. The
diffusion ribs may be spaced apart such that diffusion flow
fields formed between the diffusion ribs have different
cross-sectional areas for respective regions at ends adjacent
to the manifold regions.

20 Claims, 5 Drawing Sheets

120(120a,120b)
130(130a,130b)
141(141a~141c)
142(142a~142c)

-RELATED ART-

120(120a,120b)
130(130a,130b)
141(141a~141c)
142(142a~142c)

120(120a,120b)
130(130a,130b)
143(143a~143c)
144(144a~144c)

SEPARATOR FOR FUEL CELL

CROSS-REFERENCE TO RELATED APPLICATION

The present application claims priority to Korean Patent Application No. 10-2022-0112196, filed on Sep. 5, 2022, the contents of which are incorporated herein by reference.

FIELD

The disclosure relates to a separator for a fuel cell, and more particularly, to a separator for a fuel cell comprising a diffusion region that forms a non-uniform cross-sectional area that is different in different regions depending on a flow path for each region so that the separator for the fuel cell is configured to uniformly distribute a flow rate of reaction gas.

BACKGROUND

A fuel cell is a kind of power generator that converts chemical energy of fuel into electric energy by electrochemically reacting the fuel. The fuel cell may be used to supply power for industry, home, and/or vehicle use. The fuel cell may also, or alternatively, supply power for small electronic products such as portable devices. Fuel cells may be useful as a high-efficiency clean energy sources.

In a fuel cell, a membrane-electrode assembly (MEA) may be located at an internal position of the fuel cell. The MEA may comprise a polymer electrolyte membrane that may move protons, and catalyst layers configured to allow hydrogen and oxygen to react on either sides of the electrolyte membrane, thereby acting as an anode and a cathode.

Further, a Gas Diffusion Layer (GDL) may be stacked on an outer portion of the MEA to the anode and the cathode. A separator configured to supply fuel to the anode and cathode and to discharge water produced by the reaction may be formed on the outside of the GDL. Flow fields may develop in the separator of the fuels and/or discharged water during operation of the fuel cell. An end plate for supporting and fixing each of the above-described components may be coupled to an outermost portion of the fuel cell. A gasket may be formed in various patterns, locations, etc., but configured so as to prevent leakage of hydrogen, oxygen (air), and coolant flowing in the separator during operation of the fuel cell.

The separator may comprise lands configured to serve as a support for fluid flow and channels configured to direct a flow path of fluid (e.g., fuel and/or reaction product). The lands and channels may be repeatedly formed.

For example, the separator may have a structure in which lands and the channels are repeatedly bent. The channel may, on one side, face the GDL and serve as a space through which reaction gas such as hydrogen or air may flow, and the channel, on the other side, may serve as a space through which a cooling medium such as coolant may flows. One unit cell may comprise two separators, such as one separator having a hydrogen/coolant channel and one separator having an air/coolant channel.

FIG. 1 shows a diagram illustrating a separator for a fuel cell according to a related art.

FIG. 1 shows an example conventional separator 10 that comprises a reaction region 10a which is formed in a central portion by stacking MEAs and GDLs so that reaction gases, i.e., hydrogen and air (oxygen) react with each other, and a pair of manifold regions 10b which are formed on opposite sides of the reaction region 10a and through which a plurality of manifolds 11 passes. The plurality of manifolds 11 be configured for introducing or discharging the reaction gas or coolant. A pair of diffusion regions 10c between the pair of manifold regions 10b and the reaction region 10a may be configured to diffuse the flow of the reaction gas or coolant.

The plurality of manifolds 11 in the manifold regions 10b may comprise manifolds 11d and 11c through which hydrogen as reaction gas may be introduced or discharged, manifolds 11a and 11f through which air as reaction gas may be introduced or discharged, and manifolds 11b and 11e through which coolant may be introduced or discharged.

A plurality of diffusion ribs 13 in the pair of diffusion regions 10c may form a plurality of diffusion flow fields 14 configured to allow diffusion of reaction gas and/or coolant introduced from the inlet-side manifolds 11a, 11d, and 11e and/or to cause the reaction gas and the coolant to flow into the reaction region 10a. The diffusion flow fields 14 may also, or alternatively, be configured to collect the reaction gas and/or the coolant discharged from the reaction region 10a, so as to cause the reaction gas and the coolant to flow into the outlet-side manifolds 11b, 11c, and 11f.

The diffusion flow fields 14 may be formed between the diffusion ribs 13 and/or between diffusion ribs and adjacent portions of the fuel cell. For example, the diffusion rib 13 protrudes from a surface of the separator in relief, while the diffusion flow field 14 is recessed in intaglio from the surface of the separator.

The separator may comprise a cathode separator. A reaction-gas inlet port 12a configured to introduce air may be formed in and/or near the inlet-side manifold 11a, and a reaction-gas outlet port 12b configured to discharge air may be formed in and/or near the outlet-side manifold 11f.

A plurality of inlet-side diffusion ribs 13a and inlet-side diffusion flow fields 14a may be alternately formed. The plurality of inlet-side diffusion ribs 13a may form the inlet-side diffusion flow fields 14a such that reaction gas (e.g., air as a reaction gas, etc.) may flow while being diffused from the inlet-side manifold 11a to the reaction region.

A plurality of outlet-side diffusion ribs 13b and outlet-side diffusion flow fields 14b may be alternately formed. The plurality of outlet-side diffusion ribs 13b and may form the outlet-side diffusion flow fields 14b so that air as the reaction gas flows while being collected from the reaction region 10a to the outlet-side manifold 11f.

The plurality of inlet-side diffusion flow fields 14a may have the same cross-sectional area at an end adjacent to the inlet-side manifold 11a (e.g., the plurality of inlet-side diffusion ribs 13a may be evenly spaced at the end adjacent to the inlet-side manifold 11a). The plurality of inlet-side diffusion flow fields may also have a same cross-sectional area at an end adjacent to the reaction region 10a.

Likewise, the plurality of outlet-side diffusion flow fields 14b may have the same cross-sectional area at an end adjacent to the reaction region 11f. The plurality of outlet-side diffusion flow fields may also have a same cross-sectional area at an end adjacent to the outlet-side manifold 11f.

In particular, the plurality of inlet-side diffusion ribs 13a and inlet-side diffusion flow fields 14a are in point symmetrical with the plurality of outlet-side diffusion ribs 13b and outlet-side diffusion flow fields 14b with respect to a central point of the reaction region 10a.

As such, the cross-sectional areas of the plurality of inlet-side diffusion flow fields 14a and outlet-side diffusion flow fields 14b may be formed under the same condition (e.g., to have a same structure and/or formed by the same process). It would be preferable that a reaction gas (e.g., air) be introduced while being uniformly diffused, and be discharged while being uniformly collected. However, the actual fuel cell 10 has a problem in that the flow rate excessively flows in regions where the flow path is short in the diffusion region 10c, such as the inlet-side diffusion flow field 14a formed in an upper portion (e.g., in the vertical direction of FIG. 1), and the outlet-side diffusion flow fields 14b in a lower portion (e.g., in the vertical direction of FIG. 1).

The foregoing is intended merely to aid in the understanding of the background of the present disclosure, and is not intended to mean that the present disclosure falls within the purview of what is already known to those skilled in the art.

SUMMARY

The following summary presents a simplified summary of certain features. The summary is not an extensive overview and is not intended to identify key or critical elements.

Systems, apparatuses, and methods are described for a separator for a fuel cell and operation thereof. The separator for a fuel cell may comprise a reaction region; a pair of manifold regions provided on opposite sides of the reaction region, wherein each manifold region comprises a plurality of manifolds configured to allow fluid to be introduced to or discharged from the reaction region; a pair of diffusion regions between the reaction region and the pair of manifold regions, wherein the pair of diffusion regions are configured to diffuse a flow of the fluid into or out of the reaction region; and diffusion ribs in the diffusion regions, wherein the diffusion ribs are spaced apart from each other in a direction along a side of the manifolds. A plurality of diffusion flow fields may be formed between adjacent diffusion ribs of the diffusion ribs. The plurality of diffusion flow fields may have different cross-sectional areas at ends adjacent to the manifold regions, and the different cross-sectional areas are different based on positions along the manifold regions.

Also, or alternatively, the separator for the fuel cell may comprise a reaction region; a pair of manifold regions on opposite sides of the reaction region, comprising a plurality of manifolds configured to allow fluid to be introduced to or discharged from the reaction region; a pair of diffusion regions between the reaction region and the pair of manifold regions, wherein the pair of diffusion regions are configured to diffuse a flow of the fluid into or out of the reaction region; and a plurality of diffusion ribs in the diffusion regions, wherein the plurality of diffusion ribs are spaced apart from each other in a direction along the manifolds, wherein a plurality of diffusion flow fields are formed between adjacent diffusion ribs of the diffusion ribs. The plurality of diffusion flow fields may have different cross-sectional areas at ends adjacent to the reaction region. The different cross-sectional areas may be different based on positions of the ends adjacent to the reaction region.

These and other features and advantages are described in greater detail below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
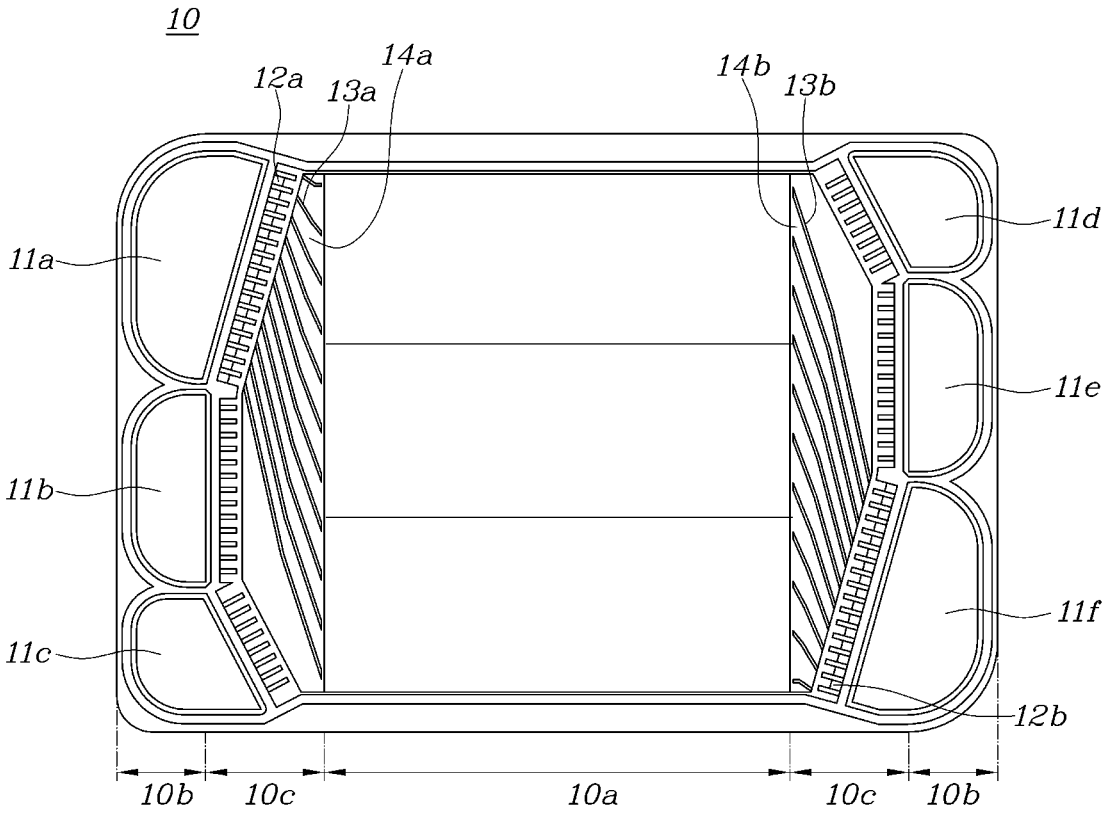
FIG. 1 is a diagram illustrating a conventional separator.

Hereinafter, the present disclosure will be described in detail with reference to the accompanying drawings. The same reference numerals are used throughout the drawings to designate the same or similar components.

The terms "module", "unit", etc., in this specification are given or used together for the ease of description, but do not have a distinct meaning or function.

When it is determined that the detailed description of the known art related to the present disclosure may be obscure the gist of the disclosure, the detailed description thereof will be omitted. Further, it is to be understood that the accompanying drawings are merely for facilitating understanding of the examples disclosed herein to those skilled in the art. The present disclosure is intended to cover not only the examples disclosed herein, but also various alternatives, equivalents, and/or substitutes that fall within the spirit and scope of the present disclosure.

Although the terms "first", "second", etc., may be used herein to describe various elements, these elements should not be limited by these terms. These terms are only used to distinguish one element from another element.

It will be understood that an element being referred to as "coupled" or "connected" to another element may mean the element is directly coupled or connected to the other element or indirectly coupled to the other element (e.g., one or more intervening elements may be present therebetween). In contrast, it should be understood that when an element is referred to as being "directly coupled" or "directly connected" to another element, there are no intervening elements present.

Herein, singular forms are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Figure 2:
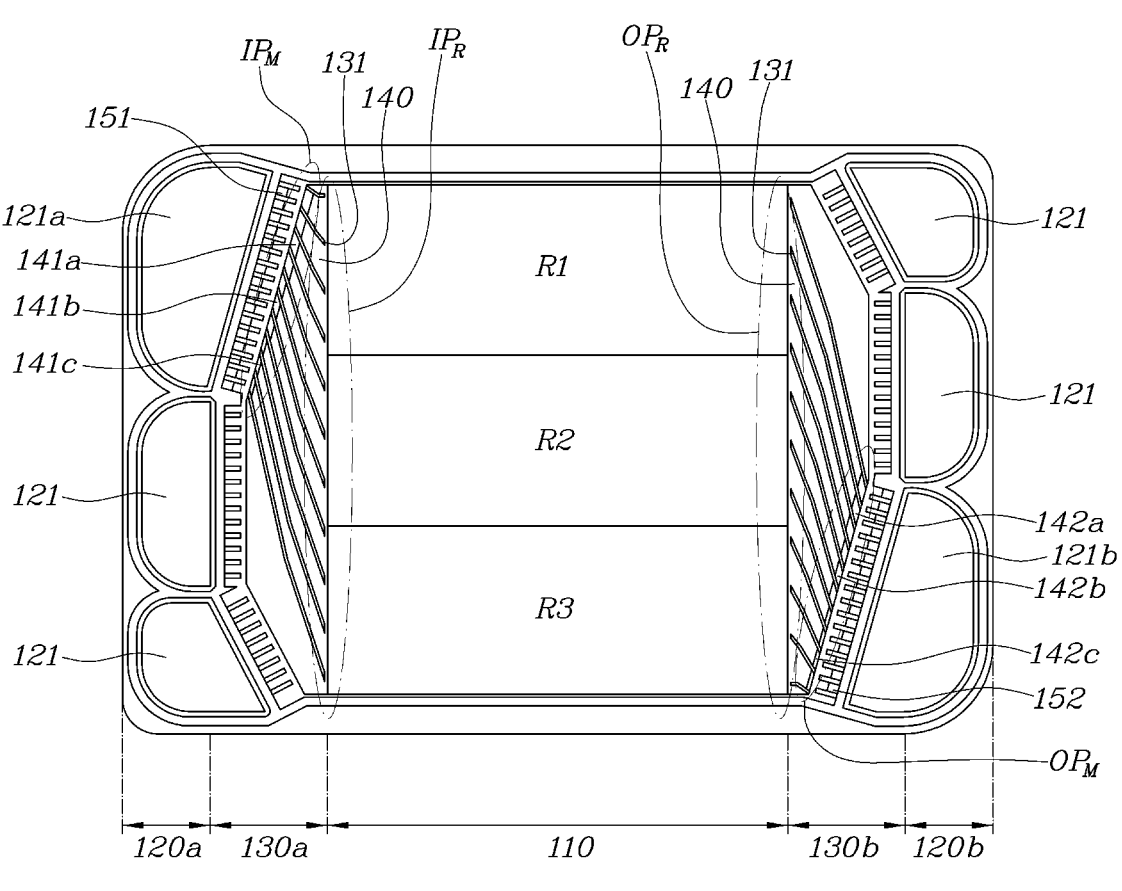
FIG. 2 is a diagram illustrating a separator for a fuel cell according to the present disclosure.
Figure 3A:
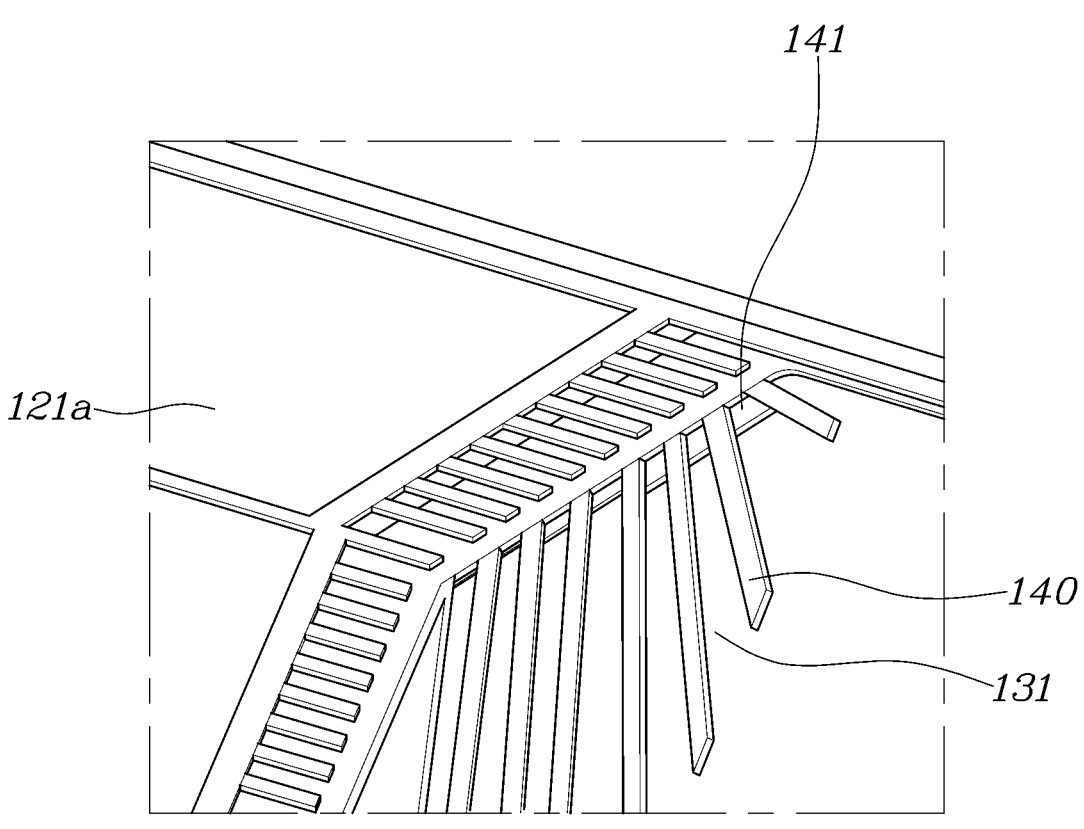
FIG. 3A is a diagram illustrating the shape of a diffusion flow field and a protrusion in an inlet-side diffusion region formed in the separator for the fuel cell according to an example of the present disclosure.
Figure 3B:
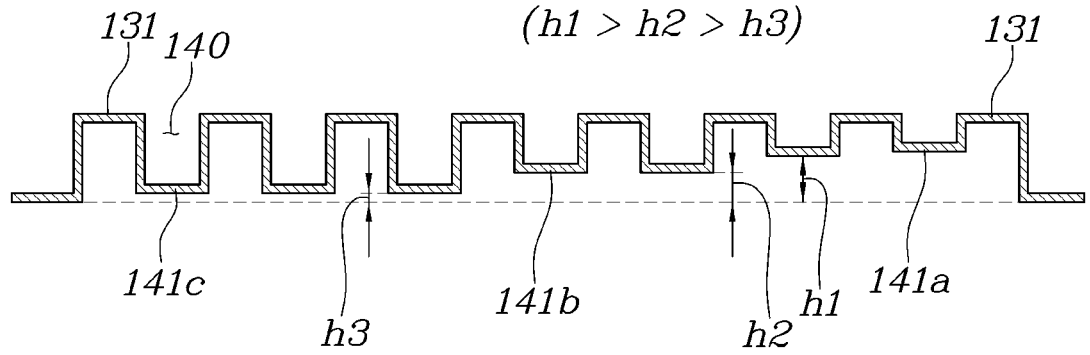
FIG. 3B is a sectional view illustrating a section of a manifold region adjacent to an inlet-side manifold region in FIG. 2.
Figure 4:
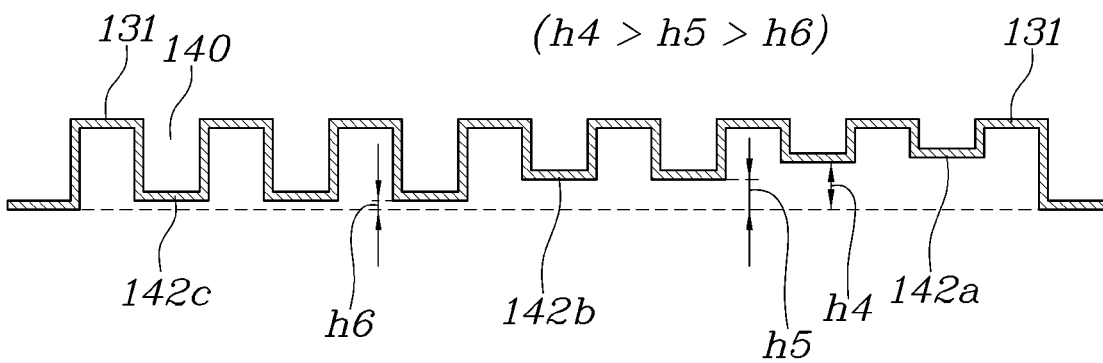
FIG. 4 is a sectional view illustrating a section of the manifold region adjacent to an outlet-side manifold region in FIG. 2.

FIG. 2 is a diagram illustrating a separator for a fuel cell according to the present disclosure, FIG. 3A is a diagram illustrating the shape of a diffusion flow field and a protrusion in an inlet-side diffusion region formed in the separator for the fuel cell according to the present disclosure, FIG. 3B is a sectional view illustrating a section of a manifold region adjacent to an inlet-side manifold region in FIG. 2, and FIG. 4 is a sectional view illustrating a section of the manifold region adjacent to an outlet-side manifold region in FIG. 2.

As shown in FIG. 2, a separator 100 for a fuel cell according to the present disclosure includes a reaction region 110 which is formed in a central portion thereof by stacking MEAs and GDLs so that reaction gases, (e.g., hydrogen and air (oxygen)) may react with each other, and a pair of manifold regions 120 which may be formed on opposite sides of the reaction region 110 and through which a plurality of manifolds 121 may pass, configured to introduce or discharge reaction and/or waste fluids (e.g., the reaction gas or coolant, as an example that will be discussed throughout the following for non-limiting illustrative purposes) to and/or from the reaction region 110. Further, a pair of diffusion regions 130 between the pair of manifold regions 120 and the reaction region 110 may be configured to diffuse the flow of the reaction gas or coolant.

A plurality of manifolds 121 may be provided in the manifold regions 120 configured to allow fluid to be introduced and/or discharged (e.g., through which hydrogen as reaction gas may be introduced or discharged, through which air as reaction gas may be introduced or discharged, and/or through which coolant may be introduced or discharged).

Further, a plurality of diffusion ribs 131 may be provided in the pair of diffusion regions 130. The plurality of diffusion ribs 131 may form a plurality of diffusion flow fields 140 therebetween (e.g., spaces defined by adjacent diffusion ribs). The plurality of diffusion flow fields 140 may be configured to diffuse reaction gas and/or coolant introduced from the inlet-side manifolds 121 to cause the reaction gas and/or the coolant to flow into the reaction region 110, and collects the reaction gas and/or the coolant discharged from the reaction region 110 to cause the reaction gas and the coolant to flow into the outlet-side manifolds 121.

Here, the diffusion flow fields 140 and the diffusion ribs 131 may be alternately formed in relief and intaglio, like channels and lands formed in the reaction region 110. For example, the diffusion ribs 131 protrude from a surface of the separator in relief, while the diffusion flow field 140 is recessed in intaglio from the surface of the separator.

In a case that the separator 100 is a cathode separator, a plurality of reaction-gas inlet ports 151 through which air may be introduced may be formed in the vicinity of the inlet-side manifold 121a, and a plurality of reaction-gas outlet ports 152 through which air may be discharged may be formed in the vicinity of the outlet-side manifold 121b.

Here, a plurality of diffusion flow fields 140 and diffusion ribs 131 may be alternately formed, configured to diffuse the flow of the reaction gas from the manifold 121a through which the reaction gas may be introduced to the reaction region 110 in the diffusion region 130, and to collect the flow of the reaction gas to the manifold 121b through which the reaction gas may be discharged from the reaction region 110.

According to the present disclosure, the cross-sectional area of the diffusion flow field 140 defined in the diffusion region 130a or 130b may be different in different regions depending on the flow path of the reaction gas. For description only, the separator 100 is discussed as divided into different regions in the following.

For example, the pair of manifold regions 120 is divided into the inlet-side manifold region 120a formed on a side where the reaction gas may be introduced, and the outlet-side manifold region 120b formed on a side where the reaction gas may be discharged.

The pair of diffusion regions 130 is divided into the inlet-side diffusion region 130a formed on a side where the reaction gas may be introduced, and the outlet-side diffusion region 130b formed on a side where the reaction gas may be discharged.

Further, the reaction region 110 is divided into an upper reaction region R1, a middle reaction region R2, and a lower reaction region R3, with upper, middle and lower referring to a vertical direction in FIG. 2 (e.g., an intended gravitational direction).

The inlet-side diffusion region 130a is divided into a manifold-region section IP M adjacent to the inlet-side manifold region 120a and a reaction-region section $IP_R$ adjacent to the reaction region 110, while the outlet-side diffusion region 130b is divided into a reaction-region section $OP_R$ adjacent to the reaction region 110 and a manifold-region section OP M adjacent to the outlet-side manifold region 120b.

In order to form different cross-sectional areas of the diffusion flow fields 140 corresponding to each region R1, R2, R3, in the diffusion flow fields 140, protrusions 141 and 142 protruding in the same direction as the diffusion rib 131 may be formed on ends adjacent to the inlet-side manifold region 120a and the outlet-side manifold region 120b, and the heights of the protrusions 141 and 142 may be differently formed for the diffusion flow fields 140 corresponding to each region R1, R2, R3. Again, the regions R1, R2, R3 are for discussion purposes only, and the reaction region could be divided into any number and arrangement of regions corresponding to the flow fields 140

Thus, the protrusions 141 formed in the manifold-region section IP M of the inlet-side diffusion region 130a may comprise inlet-side upper front-end protrusions 141a corresponding to the upper reaction region R1, inlet-side middle front-end protrusions 141b corresponding to the middle reaction region R2, and inlet-side lower front-end protrusions 141c corresponding to the lower reaction region R3.

similarly, the protrusions 142 formed in the manifold-region section OP M of the outlet-side diffusion region 130b may comprise an outlet-side upper rear-end protrusion 142a corresponding to the upper reaction region R1, an outlet-side middle rear-end protrusion 142b corresponding to the middle reaction region R2, and an outlet-side lower rear-end protrusion 142c corresponding to the lower reaction region R3.

The plurality of manifolds 121 in each of the inlet-side manifold region 120a and the outlet-side manifold region 120b may be spaced apart from each other from the top to the bottom in the vertical direction. The number of manifolds 121 may correspond to the number of reaction fluids, etc. to be introduced and/or discharged. For example, since hydrogen, and air (oxygen), and coolant may be introduced and discharged, three manifolds 121 may be formed in each of the inlet-side manifold region 120a and the outlet-side manifold region 120b from the top to the bottom in the vertical direction.

For example, when the separator 100 is applied as a cathode separator, air may be introduced through an uppermost manifold 121a. The air introduced in this way may flows while being diffused in the inlet-side diffusion region 130a, to be supplied to the reaction region 110. The air passing through the reaction region 110 may be collected in the outlet-side diffusion region 130b, and may be discharged through a lowermost manifold 121b.

To this end, the diffusion ribs 131 and the diffusion flow fields 140 formed in the inlet-side diffusion region 130a may extend from the uppermost manifold 121a to the reaction region 110.

Further, the diffusion ribs 131 and the diffusion flow fields 140 formed in the outlet-side diffusion region 130b may extend from the reaction region 110 to the lowermost manifold 121b.

In order to differently form the cross-sectional area of the diffusion flow fields 140 in diffusion regions 130*a* or 130*b* for the different regions R1, R2 and R3, depending on the flow path of the reaction gas, the height of the protrusions 141 or 142 in the corresponding diffusion flow fields 140 (e.g., distance of extending into the corresponding flow fields 140) may be different for each region R1, R2 and R2, so as to more uniformly distribute the flow rate of the reaction gas throughout the diffusion region 130*a* and/or 130*b*.

First, the inlet-side diffusion region 130*a* will be described. As shown in FIGS. 2, 3A and 3B, in the manifold-region section IP M of the inlet-side diffusion region 130*a*, the height of the protrusions 141 may be such that the height of the inlet-side upper front-end protrusion 141*a* is higher than the height of the inlet-side lower front-end protrusion 141*c*.

In the manifold-region section IP M of the inlet-side diffusion region 130*a*, the height of the protrusions 141 may, for example, be gradually lowered from the inlet-side upper front-end protrusions 141*a* to the inlet-side lower front-end protrusions 141*c*. Thus, the height of the protrusion 141 may be gradually lowered such that the height h1 of the inlet-side upper front-end protrusion 141*a* is greater than the height h2 of the inlet-side middle front-end protrusion 141*b*, which may be greater than the height h3 of the inlet-side lower front-end protrusion 141*c* (h1>h2>h3).

By varying the heights of the protrusions 141 for each region R1, R2, R3 as above, the cross-sectional areas of the diffusion flow fields 140 corresponding to each of the protrusions 141 may vary.

In the manifold-region section IP M of the inlet-side diffusion region 130*a*, length of the protrusions 141 corresponding to the diffusion flow fields 140 may be selected such that the inlet-side upper front-end protrusions 141*a* is longer than the inlet-side lower front-end protrusions 141*c*.

Preferably, in the manifold-region section IP M of the inlet-side diffusion region 130*a*, the length of the protrusion 141 is gradually reduced from the inlet-side upper front-end protrusion 141*a* to the inlet-side lower front-end protrusion 141*c*. Thus, preferably, the length of the protrusion 141 is gradually reduced in the order of the length of the inlet-side upper front-end protrusion 141*a*, the length of the inlet-side middle front-end protrusion 141*b*, and the length of the inlet-side lower front-end protrusion 141*c*.

Figure 5:
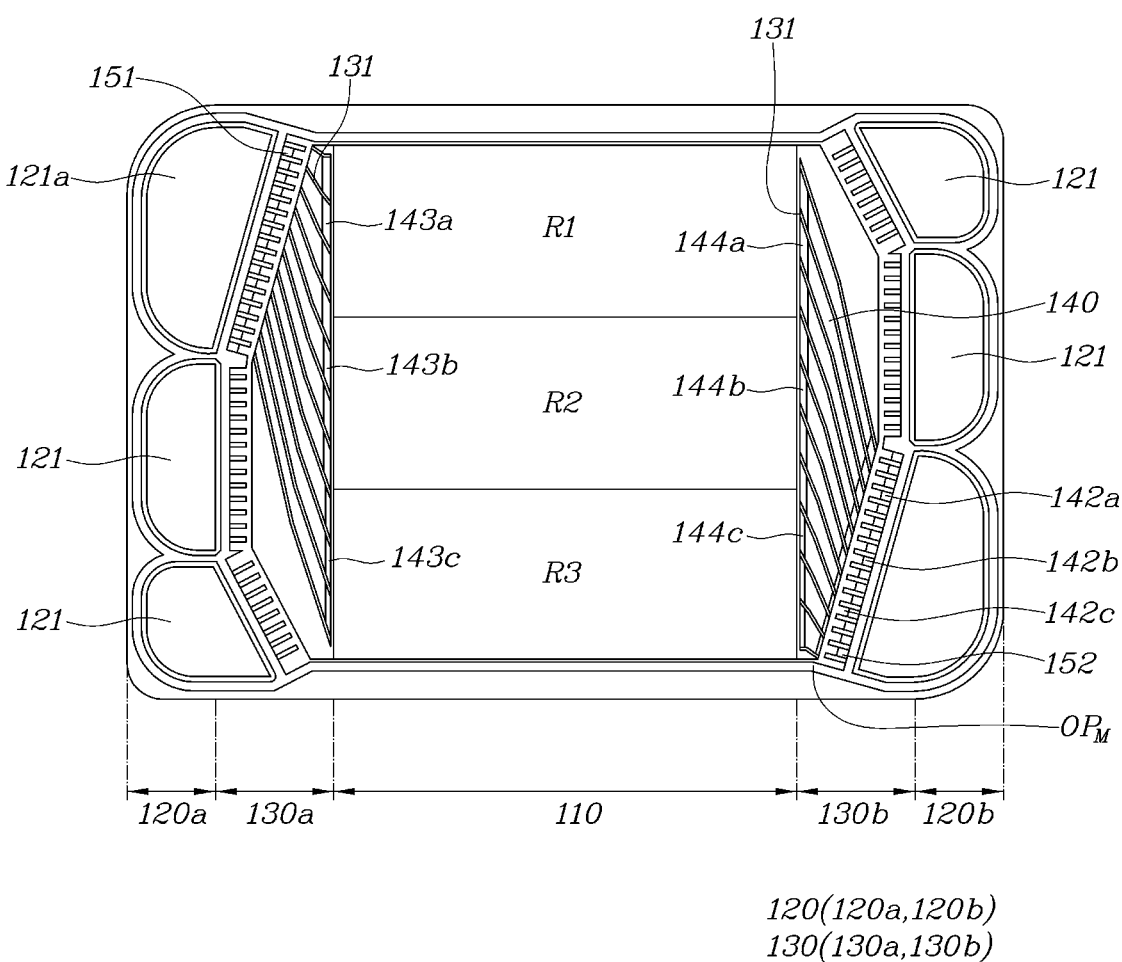
FIG. 5 is a diagram illustrating a separator for a fuel cell according to an example of the present disclosure.

Thus, in the manifold-region section IP M of the inlet-side diffusion region 130*a*, the cross-sectional area of the diffusion flow field 140 may be gradually increased as the flow path of the reaction gas is increased (e.g., from the top to the bottom in the vertical direction in FIGS. 2, 5).

Next, the outlet-side diffusion region 130*b* will be described. As shown in FIGS. 2 and 4, in the manifold-region section OP$_M$ of the outlet-side diffusion region 130*b*, the height of the protrusion 142 is formed such that the height of the outlet-side upper rear-end protrusion 142*a* may be higher than the height of the outlet-side lower rear-end protrusion 142*c*.

Preferably, in the manifold-region section OP$_M$ of the outlet-side diffusion region 130*b*, the height of the protrusion 142 may be gradually lowered from the outlet-side upper rear-end protrusion 142*a* to the outlet-side lower rear-end protrusion 142*c*. Thus, the height of the protrusions 142 may be gradually lowered such that the height h4 of the outlet-side upper rear-end protrusion 142*a* is greater than the height h5 of the outlet-side middle rear-end protrusion 142*b* which is greater than the height h6 of the outlet-side lower rear-end protrusion 142*c* (h4>h5>h6).

In the manifold-region section OP$_M$ of the outlet-side diffusion region 130*b*, a length by which the protrusions 142 is formed along the diffusion flow field 140 may be selected such that the outlet-side upper rear-end protrusion 142*a* is longer than the outlet-side lower rear-end protrusion 142*c*.

In the manifold-region section OP$_M$ of the outlet-side diffusion region 130*b*, the length of the protrusions 142 may be selected to gradually decrease from the outlet-side upper rear-end protrusion 142*a* to the outlet-side lower rear-end protrusion 142*c*. Thus, the length of the protrusions 142 may gradually be selected to decrease in the order of the length of the outlet-side upper rear-end protrusion 142*a*, the length of the outlet-side middle rear-end protrusion 142*b*, and the length of the outlet-side lower rear-end protrusion 142*c*.

In the manifold-region section OP$_M$ of the outlet-side diffusion region 130*b*, the cross-sectional area of the diffusion flow field 140 may therefore gradually be increased as the flow path of the reaction gas is increases from the top to the bottom in the vertical direction.

In the inlet-side diffusion region 130*a*, the length of each diffusion flow field 140 may gradually increase from the top to the bottom such that the diffusion flow field 140 starts from the uppermost manifold 121*a* among the manifolds formed in the inlet-side manifold region 120*a* and spreads to the entire section on one side of the reaction region 110.

In contrast, in the outlet-side diffusion region 130*b*, the length of each diffusion flow field is gradually reduced from the top to the bottom such that the diffusion flow field 140 starts from the entire section on the other side of the reaction region 110 and converges to the lowermost manifold 121*b* among the manifolds 121 formed in the outlet-side manifold region 120*b*.

Thus, the height of the protrusion 141 formed in the inlet-side diffusion region 130*a* and the height of the protrusion 142 formed in the outlet-side diffusion region 130*b* may be asymmetrical with respect to the central point of the reaction region 110.

As the shape of the diffusion flow fields 140 in the inlet-side diffusion region 130*a* and the shape of the diffusion flow fields 140 in the outlet-side diffusion region 130*b* may be asymmetrically formed, uniform introduction and collection of reaction gas and smooth discharge of produced water and/or other waste may be realized.

In addition, since the cross-sectional area of the diffusion flow fields 140 in the inlet-side diffusion region 130*a* gradually increases from the top to the bottom, the reaction gas introduced through the plurality of diffusion flow fields 140 to the reaction region 110 may be uniformly introduced throughout the entire reaction region 110.

Further, since the cross-sectional area of the diffusion flow fields 140 in the outlet-side diffusion region 130*b* gradually increases from the top to the bottom, the produced water and/or other waste concentrating on a lower portion in the vertical direction may be smoothly discharged, and the reaction gas discharged from the reaction region 110 may be uniformly discharged through the diffusion flow field 140 formed in the outlet-side diffusion region 130*b*.

To maintain a constant flow velocity of the reaction gas introduced into the reaction region, the positions of the protrusions 141 formed in the diffusion flow fields 140 may be varied.

In the above example, the protrusions 141 and 142 formed in the diffusion flow field 140 may be formed in sections adjacent to the manifold regions 130*a* and 130*b*. Also, or alternatively, the protrusions 143 and 144 may be formed in the section adjacent to the reaction region 110.

FIG. 5 is a diagram illustrating a separator for a fuel cell according to another example of the present disclosure. As in the preceding embodiment example, the separator for the fuel cell may comprise a reaction region 110, and a pair of manifold regions 120 on opposite sides of the reaction region 110. A pair of diffusion regions 130 may be provided between the pair of manifold regions 120 and the reaction region 110.

To the extent the components of the separator and the terms designated for respective regions are duplicated in the preceding example, a duplicated description thereof is omitted herein.

As in the preceding example, a plurality of diffusion flow fields 140 and diffusion ribs 131 may be alternately formed in the pair of diffusion regions 130. The protrusions 143 and 144 having different heights for respective regions may be formed in the plurality of diffusion flow fields 140.

The plurality of diffusion flow fields 140 may have different cross-sectional areas for respective regions at ends adjacent to the reaction region 110. The protrusions 143 and 144 protruding in the same direction as the diffusion rib 131 may be formed on the ends adjacent to the reaction region 110 in the diffusion flow field 140, and the heights of the protrusions 143 and 144 may be differently formed for respective regions.

Thus, the protrusions 143 formed in a reaction-region section $IP_R$ of the inlet-side diffusion region 130*a* may be divided into an inlet-side upper rear-end protrusion 143*a* extending to the upper reaction region R1, an inlet-side middle rear-end protrusion 143*b* extending to the middle reaction region R2, and an inlet-side lower rear-end protrusion 143*c* extending to the lower reaction region R3.

Here, in the reaction-region section $IP_R$ of the inlet-side diffusion region 130*a*, the height of the protrusion 143 may be formed such that the height of the inlet-side upper rear-end protrusion 143*a* is higher than the height of the inlet-side lower rear-end protrusion 143*c*.

Preferably, in the reaction-region section $IP_R$ of the inlet-side diffusion region 130*a*, the height of the protrusions 143 may be gradually lowered from the inlet-side upper rear-end protrusion 143*a* to the inlet-side lower rear-end protrusion 143*c*. Thus, the height of the protrusions 143 may be gradually lowered in the order of the height of the inlet-side upper rear-end protrusion 143*a*, the height of the inlet-side middle rear-end protrusion 143*b*, and the height of the inlet-side lower rear-end protrusion 143*c*.

Also, or alternatively, a section in which the cross-sectional area of the diffusion flow fields 140 may be different for each region, by providing different length protrusions 143 for the diffusion flow fields 140 in each region.

In the reaction-region section $IP_R$ of the inlet-side diffusion region 130*a*, lengths of the protrusions 143 along the diffusion flow fields 140 may be such that the inlet-side upper rear-end protrusion 143*a* is longer than the inlet-side lower rear-end protrusion 143*c*.

In the reaction-region section $IP_R$ of the inlet-side diffusion region 130*a*, lengths of the protrusions 143 may decrease (e.g., monotonically and/or gradually) from the inlet-side upper rear-end protrusion 143*a* to the inlet-side lower rear-end protrusion 143*c*. Thus, the lengths of the protrusions 143 may be gradually reduced in the order of the length of the inlet-side upper rear-end protrusion 143*a*, the length of the inlet-side middle rear-end protrusion 143*b*, and the length of the inlet-side lower rear-end protrusion 143*c*.

The protrusions 144 in the outlet-side diffusion region 130*b* may be divided into an outlet-side upper front-end protrusion 144*a* extending from the upper reaction region R1, an outlet-side middle front-end protrusion 144*b* extending from the middle reaction region R2, and an outlet-side lower front-end protrusion 144*c* extending from the lower reaction region R3.

Here, in the reaction-region section $OP_R$ of the outlet-side diffusion region 130*b*, the heights of the protrusions 144 is formed such that the height of the outlet-side upper front-end protrusion 144*a* is higher than the height of the outlet-side lower front-end protrusion 144*c*.

Preferably, in the reaction-region section $OP_R$ of the outlet-side diffusion region 130*a*, the heights of the protrusions 144 may decrease from the outlet-side upper front-end protrusion 144*a* to the outlet-side lower front-end protrusion 144*c*. Thus, the height of the protrusions 144 is gradually reduced in the order of the height of the outlet-side upper front-end protrusion 144*a*, the height of the outlet-side middle front-end protrusion 144*b*, and the height of the outlet-side lower front-end protrusion 144*c*.

Further, even in another embodiment, a section in which the cross-sectional area of the diffusion flow field 140 is adjusted may be differently formed for each region, by differently forming the length of the protrusion 144 for each region.

To this end, in the reaction-region section $OP_R$ of the outlet-side diffusion region 130*b*, lengths of the protrusions 144 along the diffusion flow field 140 may be such that the outlet-side upper front-end protrusion 144*a* is longer than the outlet-side lower front-end protrusion 144*c*.

In the reaction-region section $OP_R$ of the outlet-side diffusion region 130*a*, the length of the protrusion 144 may decrease (e.g., monotonically and/or gradually) from the outlet-side upper front-end protrusion 144*a* to the outlet-side lower front-end protrusion 144*c*. Thus, the lengths of the protrusions 144 may decrease in the order of the length of the outlet-side upper front-end protrusion 144*a*, the length of the outlet-side middle front-end protrusion 144*b*, and the length of the outlet-side lower front-end protrusion 144*c*.

The present disclosure has been made keeping in mind the above problems occurring in the related art, and an objective of the present disclosure is to provide a separator for a fuel cell, which is capable of uniformly distributing the flow rate of reaction gas by differently forming the cross-sectional area of a diffusion flow field defined in a diffusion region depending on a flow path for each region.

The present disclosure is not limited to the above-mentioned objective. Other objectives of the present disclosure will be clearly understood by those skilled in the art from the following description.

In order to achieve the objective of the present disclosure, the present disclosure provides a separator for a fuel cell, including a reaction region formed in a central portion thereof; a pair of manifold regions which are formed on opposite sides of the reaction region and through which a plurality of manifolds passes to introduce or discharge reaction gas or coolant; and a pair of diffusion regions formed between the reaction region and the pair of manifold regions to diffuse a flow of the reaction gas or coolant. A plurality of diffusion ribs is formed in the diffusion regions to be spaced apart from each other in a direction from the manifolds through which the reaction gas is introduced or discharged to the reaction region, and a plurality of diffusion flow fields through which the reaction gas flows is formed between the diffusion ribs, and the plurality of diffusion flow fields is formed to have different cross-sectional areas for respective regions at ends adjacent to the manifold regions.

Protrusions protruding in the same direction as the diffusion ribs may be formed on the ends adjacent to the manifold regions in the plurality of diffusion flow fields, and heights of the protrusions may be differently formed for the respective regions.

The pair of manifold regions may be divided into an inlet-side manifold region formed on a side where the reaction gas is introduced, and an outlet-side manifold region formed on a side where the reaction gas is discharged, a plurality of manifolds may be formed in each of the inlet-side manifold region and the outlet-side manifold region to be spaced apart from each other from a top to a bottom in a gravitational direction, the pair of diffusion regions may be divided into an inlet-side diffusion region formed on a side where the reaction gas is introduced, and an outlet-side diffusion region formed on a side where the reaction gas is discharged, the diffusion rib and the diffusion flow field formed in the inlet-side diffusion region may be formed to extend from an uppermost manifold among the manifolds formed in the inlet-side manifold region to the reaction region, and the diffusion rib and the diffusion flow field formed in the outlet-side diffusion region may be formed to extend from the reaction region to a lowermost manifold among the manifolds formed in the outlet-side manifold region.

A height of the protrusion formed in the inlet-side diffusion region and a height of the protrusion formed in the outlet-side diffusion region may be asymmetrically formed with respect to a central point of the reaction region.

The reaction region may be divided into an upper reaction region, a middle reaction region, and a lower reaction region when seen from the top to the bottom in the gravitational direction, each of the inlet-side diffusion region and the outlet-side diffusion region may be divided into a manifold-region section adjacent to each of the inlet-side manifold region and the outlet-side manifold region and a reaction-region section adjacent to the reaction region, a protrusion formed in the inlet-side diffusion region may be formed in the manifold-region section, the protrusion formed in the manifold-region section of the inlet-side diffusion region may be divided into an inlet-side upper front-end protrusion extending to the upper reaction region, an inlet-side middle front-end protrusion extending to the middle reaction region, and an inlet-side lower front-end protrusion extending to the lower reaction region, and, in the manifold-region section of the inlet-side diffusion region, the height of the protrusion may be formed such that the height of the inlet-side upper front-end protrusion is higher than the height of the inlet-side lower front-end protrusion.

The heights of the plurality of protrusions formed in the manifold-region section of the inlet-side diffusion region may be gradually lowered from the top to the bottom in the gravitational direction.

In the manifold-region section of the inlet-side diffusion region, a length by which the protrusion is formed along the diffusion flow field may be formed such that the inlet-side upper front-end protrusion is longer than the inlet-side lower front-end protrusion.

The lengths of the plurality of protrusions formed in the manifold-region section of the inlet-side diffusion region may be gradually reduced from the top to the bottom in the gravitational direction.

The reaction region may be divided into an upper reaction region, a middle reaction region, and a lower reaction region when seen from the top to the bottom in the gravitational direction, each of the inlet-side diffusion region and the outlet-side diffusion region may be divided into a manifold-region section adjacent to each of the inlet-side manifold region and the outlet-side manifold region and a reaction-region section adjacent to the reaction region, the protrusion formed in the manifold-region section of the outlet-side diffusion region may be divided into an outlet-side upper rear-end protrusion extending from the upper reaction region, an outlet-side middle rear-end protrusion extending from the middle reaction region, and an outlet-side lower rear-end protrusion extending from the lower reaction region, and, in the manifold-region section of the outlet-side diffusion region, the height of the protrusion is formed such that the height of the outlet-side upper rear-end protrusion may be higher than the height of the outlet-side lower rear-end protrusion.

The heights of the plurality of protrusions formed in the manifold-region section of the outlet-side diffusion region may be gradually lowered from the top to the bottom in the gravitational direction.

In the manifold-region section of the outlet-side diffusion region, a length by which the protrusion is formed along the diffusion flow field may be formed such that the outlet-side upper rear-end protrusion is longer than the inlet-side lower rear-end protrusion.

The lengths of the plurality of protrusions formed in the manifold-region section of the outlet-side diffusion region may be gradually reduced from the top to the bottom in the gravitational direction.

In order to achieve the objective of the present disclosure, the present disclosure provides a separator for a fuel cell, including a reaction region formed in a central portion thereof; a pair of manifold regions which are formed on opposite sides of the reaction region and through which a plurality of manifolds passes to introduce or discharge reaction gas or coolant; and a pair of diffusion regions formed between the reaction region and the pair of manifold regions to diffuse a flow of the reaction gas or coolant, wherein a plurality of diffusion ribs is formed in the diffusion regions to be spaced apart from each other in a direction from the manifolds through which the reaction gas is introduced or discharged to the reaction region, and a plurality of diffusion flow fields through which the reaction gas flows is formed between the diffusion ribs, and the plurality of diffusion flow fields are formed to have different cross-sectional areas for respective regions at ends adjacent to the reaction region.

Protrusions protruding in the same direction as the diffusion ribs may be formed on the ends adjacent to the reaction region in the plurality of diffusion flow fields, and heights of the protrusions may be differently formed for the respective regions.

The pair of manifold regions may be divided into an inlet-side manifold region formed on a side where the reaction gas is introduced, and an outlet-side manifold region formed on a side where the reaction gas is discharged, a plurality of manifolds may be formed in each of the inlet-side manifold region and the outlet-side manifold region to be spaced apart from each other from a top to a bottom in a gravitational direction, the pair of diffusion regions may be divided into an inlet-side diffusion region formed on a side where the reaction gas is introduced, and an outlet-side diffusion region formed on a side where the reaction gas is discharged, the diffusion rib and the diffusion flow field formed in the inlet-side diffusion region may be formed to extend from an uppermost manifold among the manifolds formed in the inlet-side manifold region to the reaction region, and the diffusion rib and the diffusion flow field formed in the outlet-side diffusion region may be formed to extend from the reaction region to a lowermost manifold among the manifolds formed in the outlet-side manifold region.

A height of the protrusion formed in the inlet-side diffusion region and a height of the protrusion formed in the outlet-side diffusion region may be asymmetrically formed with respect to a central point of the reaction region.

The reaction region may be divided into an upper reaction region, a middle reaction region, and a lower reaction region when seen from the top to the bottom in the gravitational direction, each of the inlet-side diffusion region and the outlet-side diffusion region may be divided into a manifold-region section adjacent to each of the inlet-side manifold region and the outlet-side manifold region and a reaction-region section adjacent to the reaction region, a protrusion formed in the inlet-side diffusion region may be formed in the reaction-region section, the protrusion formed in the reaction-region section of the inlet-side diffusion region may be divided into an inlet-side upper rear-end protrusion extending to the upper reaction region, an inlet-side middle rear-end protrusion extending to the middle reaction region, and an inlet-side lower rear-end protrusion extending to the lower reaction region, and, in the reaction-region section of the inlet-side diffusion region, the height of the protrusion may be formed such that the height of the inlet-side upper rear-end protrusion is higher than the height of the inlet-side lower rear-end protrusion.

In the reaction-region section of the inlet-side diffusion region, a length by which the protrusion is formed along the diffusion flow field may be formed such that the inlet-side upper rear-end protrusion is longer than the inlet-side lower rear-end protrusion.

The reaction region may be divided into an upper reaction region, a middle reaction region, and a lower reaction region when seen from the top to the bottom in the gravitational direction, each of the inlet-side diffusion region and the outlet-side diffusion region may be divided into a manifold-region section adjacent to each of the inlet-side manifold region and the outlet-side manifold region and a reaction-region section adjacent to the reaction region, the protrusion formed in the outlet-side diffusion region may be formed in the reaction-region section, the protrusion formed in the outlet-side diffusion region may be divided into an outlet-side upper front-end protrusion extending from the upper reaction region, an outlet-side middle front-end protrusion extending from the middle reaction region, and an outlet-side lower front-end protrusion extending from the lower reaction region, and, in the reaction-region section of the outlet-side diffusion region, the height of the protrusion may be formed such that the height of the outlet-side upper front-end protrusion is higher than the height of the outlet-side lower front-end protrusion.

In the reaction-region section of the outlet-side diffusion region, a length by which the protrusion is formed along the diffusion flow field may be formed such that the outlet-side upper front-end protrusion is longer than the inlet-side lower front-end protrusion.

An example of the present disclosure is advantageous in that it is possible to uniformly distribute the flow rate of reaction gas throughout a diffusion region by differently forming the cross-sectional area of a diffusion flow field depending on a flow path for each region.

Further, as the cross-sectional area of a diffusion flow field formed in an inlet-side diffusion region and the cross-sectional area of a diffusion flow field formed in an outlet-side diffusion region are asymmetrical with respect to the central point of a reaction region, it can be expected that the flow rate of reaction gas is uniformly distributed throughout the diffusion region in consideration of the length of the flow path of the reaction gas that may be structurally generated depending on the position of a manifold.

Thus, since the uniform flow of reaction gas and the uniform discharge of produced water may be expected, the durability of a stack can be improved, and non-uniform electrochemical reactions at the upper and lower ends of the stack can be prevented.

Further, through these effects, the performance of a stack can be improved, it is possible to suppress the occurrence of a voltage deviation during the operation of the stack, and to alleviate the shaking of a cell.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A separator for a fuel cell, comprising:
a reaction region;
a pair of manifold regions provided on opposite sides of the reaction region, wherein each of the pair of manifold regions comprises a plurality of manifolds configured to allow fluid to be introduced to or discharged from the reaction region;
a pair of diffusion regions between the reaction region and the pair of manifold regions, wherein the pair of diffusion regions are configured to diffuse a flow of the fluid into or out of the reaction region; and
diffusion ribs in the diffusion regions, wherein the diffusion ribs are spaced apart from each other in a direction along a side of the manifolds,
wherein a plurality of diffusion flow fields are formed between adjacent diffusion ribs of the diffusion ribs,
wherein the plurality of diffusion flow fields have different cross-sectional areas at ends adjacent to the manifold regions,
wherein the different cross-sectional areas are different based on positions along the manifold regions, and
wherein the separator further comprises protrusions, protruding from a base surface of the plurality of diffusion flow fields, protruding in a same direction as the diffusion ribs at ends of the diffusion ribs adjacent to the manifold regions, wherein heights of the protrusions are different based on positions of the protrusions along the manifold regions.

2. The separator of claim 1, wherein the pair of manifold regions comprise an inlet-side manifold region configured to introduce the fluid, and an outlet-side manifold region configured to discharge the fluid,
wherein a plurality of manifolds of the inlet-side manifold region are arranged along an inlet side of the reaction region from a first side of the reaction region to a second side of the reaction region and a plurality of manifolds of the outlet-side manifold region are arranged along an outlet side of the reaction region from the first side of the reaction region to the second side of the reaction region,
wherein the pair of diffusion regions comprises an inlet-side diffusion region between the inlet-side manifold region and the reaction region, and an outlet-side diffusion region between the outlet-side manifold region and the reaction region, wherein the diffusion ribs in the inlet-side diffusion region extend from an end manifold, among the manifolds in the inlet-side manifold region, to the reaction region, wherein the diffusion ribs in the outlet-side diffusion region extend from the reaction region to an end manifold, among the manifolds in the outlet-side manifold region, and wherein the end manifold among the manifolds in the inlet-side manifold region is an end manifold towards the first side of the reaction region and the end manifold among the manifolds in the outlet-side manifold region is an end manifold towards the second side of the reaction region.

3. The separator of claim 2, wherein heights of the protrusions in the inlet-side diffusion region and heights of the protrusions in the outlet-side diffusion region are asymmetrical with respect to a central point of the reaction region.

4. The separator of claim 2, wherein the reaction region comprises, in a direction from the first side of the reaction region to the second side of the reaction region, a first reaction region, a second reaction region, and a third reaction region, wherein the inlet-side diffusion region comprises a manifold-region section adjacent to the inlet-side manifold region and a reaction-region section adjacent to the reaction region, wherein the outlet-side diffusion region comprises a manifold-region section adjacent to the outlet-side manifold region and a reaction-region section adjacent to the reaction region, wherein the protrusions in the inlet-side diffusion region are in the manifold-region section of the inlet-side diffusion region, wherein the protrusions in the manifold-region section of the inlet-side diffusion region comprise an inlet-side first front-end protrusion extending towards the first reaction region, an inlet-side second front-end protrusion extending towards the second reaction region, and an inlet-side third front-end protrusion extending towards the third reaction region, and in the manifold-region section of the inlet-side diffusion region, the height of the inlet-side first front-end protrusion is higher than the height of the inlet-side third front-end protrusion.

5. The separator of claim 4, wherein the heights of the protrusions in the manifold-region section of the inlet-side diffusion region decrease in a direction from the first side of the reaction region to the second side of the reaction region.

6. The separator of claim 4, wherein, in the manifold-region section of the inlet-side diffusion region, the inlet-side first front-end protrusion is longer than the inlet-side third front-end protrusion.

7. The separator of claim 4, wherein lengths of the protrusions in the manifold-region section of the inlet-side diffusion region gradually decrease in a direction from the first side of the reaction region to the second side of the reaction region.

8. The separator of claim 2, wherein the reaction region is divided into an first reaction region, a second reaction region, and a third reaction region in a direction from the first side of the reaction region to the second side of the reaction region, wherein the inlet-side diffusion region comprises a manifold-region section adjacent to the inlet-side manifold region and a reaction-region section adjacent to the reaction region, wherein the outlet-side diffusion region comprises a manifold-region section adjacent to the outlet-side manifold region and a reaction-region section adjacent to the reaction region, wherein the protrusions in the manifold-region section of the outlet-side diffusion region comprise an outlet-side first rear-end protrusion extending toward the first reaction region, an outlet-side second rear-end protrusion extending toward the second reaction region, and an outlet-side third rear-end protrusion extending toward the third reaction region, and wherein, in the manifold-region section of the outlet-side diffusion region, a height of the outlet-side first rear-end protrusion is greater than a height of the outlet-side third rear-end protrusion.

9. The separator of claim 8, wherein the heights of the protrusions in the manifold-region section of the outlet-side diffusion region gradually decrease in a direction from the first side of the reaction region to the second side of the reaction region.

10. The separator of claim 9, wherein, in the manifold-region section of the outlet-side diffusion region, a length, along the diffusion flow fields, of the outlet-side first rear-end protrusion is longer than a length of the outlet-side third rear-end protrusion.

11. The separator of claim 8, wherein lengths of the protrusions in the manifold-region section of the outlet-side diffusion region gradually decrease in a direction from the first side of the reaction region to the second side of the reaction region.

12. A separator for a fuel cell, comprising:

a reaction region;

a pair of manifold regions on opposite sides of the reaction region, comprising a plurality of manifolds configured to allow fluid to be introduced to or discharged from the reaction region;

a pair of diffusion regions between the reaction region and the pair of manifold regions, wherein the pair of diffusion regions are configured to diffuse a flow of the fluid into or out of the reaction region; and a plurality of diffusion ribs in the diffusion regions, wherein the plurality of diffusion ribs are spaced apart from each other in a direction along the manifolds, wherein a plurality of diffusion flow fields are formed between adjacent diffusion ribs of the diffusion ribs, wherein the plurality of diffusion flow fields have different cross-sectional areas at ends adjacent to the reaction region, and wherein the different cross-sectional areas are different based on positions of the ends adjacent to the reaction region, wherein the separator further comprises protrusions, protruding from a base surface of the plurality of diffusion flow fields, protruding in a same direction as the diffusion ribs at ends adjacent to the reaction region, wherein heights of the protrusions are different based on positions of the protrusions along the reaction region.

13. The separator of claim 12, wherein the pair of manifold regions comprise an inlet-side manifold region configured to introduce the fluid, and an outlet-side manifold region configured to discharge the fluid, wherein a plurality of manifolds of the inlet-side manifold region are arranged along an inlet side of the reaction region from a first side of the reaction region to a second side of the reaction region and a plurality of manifolds of the outlet-side manifold region are arranged along an outlet side of the reaction region from the first side of the reaction region to the second side of the reaction region, wherein the pair of diffusion regions comprises an inlet-side diffusion region between the inlet-side manifold region and the reaction region, and an outlet-side diffusion region between the outlet-side manifold region and the reaction region, wherein the diffusion ribs in the inlet-side diffusion region extend from an end manifold, among the manifolds in the inlet-side manifold region, to the reaction region, wherein the diffusion ribs in the outlet-side diffusion region extend from the reaction region to an end manifold, among the manifolds in the outlet-side manifold region, and wherein the end manifold among the manifolds in the inlet-side manifold region is an end manifold towards the first side of the reaction region and the end manifold among the manifolds in the outlet-side manifold region is an end manifold towards the second side of the reaction region.

14. The separator of claim 13, wherein the heights of the protrusions in the inlet-side diffusion region decrease in a direction from the first side of the reaction region to the second side of the reaction region.

15. The separator of claim 13, wherein the reaction region comprises, in a direction from the first side of the reaction region to the second side of the reaction region, a first reaction region, a second reaction region, and a third reaction region, wherein the inlet-side diffusion region comprises a manifold-region section adjacent to the inlet-side manifold region and a reaction-region section adjacent to the reaction region, wherein the outlet-side diffusion region comprises a manifold-region section adjacent to the outlet-side manifold region and a reaction-region section adjacent to the reaction region, wherein the protrusions in the inlet-side diffusion region are in the reaction-region section of the inlet-side diffusion region, wherein the protrusions in the reaction-region section of the inlet-side diffusion region comprise an inlet-side first rear-end protrusion extending to the first reaction region, an inlet-side second rear-end protrusion extending to the second reaction region, and an inlet-side third rear-end protrusion extending to the third reaction region, and in the reaction-region section of the inlet-side diffusion region, a height of the inlet-side first rear-end protrusion is greater than a height of the inlet-side third rear-end protrusion.

16. The separator of claim 15, wherein, in the reaction-region section of the inlet-side diffusion region, the inlet-side first rear-end protrusion is longer than the inlet-side third rear-end protrusion.

17. The separator of claim 13, wherein the reaction region comprises an first reaction region, a second reaction region, and a third reaction region in a direction from the first side of the reaction region to the second side of the reaction region, wherein the inlet-side diffusion region comprises a manifold-region section adjacent to the inlet-side manifold region and a reaction-region section adjacent to the reaction region, wherein the outlet-side diffusion region comprises a manifold-region section adjacent to the outlet-side manifold region and a reaction-region section adjacent to the reaction region, wherein the protrusions in the outlet-side diffusion region are in the reaction-region section, wherein the protrusions in the outlet-side diffusion region comprise an outlet-side first front-end protrusion extending from the first reaction region, an outlet-side second front-end protrusion extending from the second reaction region, and an outlet-side third front-end protrusion extending from the third reaction region, and wherein, in the reaction-region section of the outlet-side diffusion region, the height of the outlet-side first front-end protrusion is greater than the height of the outlet-side third front-end protrusion.

18. The separator of claim 17, wherein, in the reaction-region section of the outlet-side diffusion region, the outlet-side first front-end protrusion is longer than an inlet-side third front-end protrusion.

19. A separator for a fuel cell, comprising:

a reaction region;

a pair of manifold regions, on opposite sides of the reaction region, configured to allow fluid to be introduced to or discharged from the reaction region;

a pair of diffusion regions between the reaction region and the pair of manifold regions, wherein the pair of diffusion regions are configured to diffuse a flow of the fluid into or out of the reaction region;

a plurality of diffusion ribs in the diffusion regions, wherein the plurality of diffusion ribs are spaced apart from each other in a direction along manifolds in the manifold regions, wherein a plurality of diffusion flow fields are formed between adjacent diffusion ribs of the diffusion ribs; and a plurality of protrusions, protruding from a base surface of the plurality of diffusion flow fields, protruding in a same direction as the diffusion ribs at ends adjacent to the reaction region, wherein heights of the protrusions are different based on positions of the protrusions along the reaction region.

20. The separator of claim 19, wherein the pair of manifold regions comprise an inlet-side manifold region configured to introduce the fluid, and an outlet-side manifold region configured to discharge the fluid, wherein the pair of diffusion regions comprises an inlet-side diffusion region between the inlet-side manifold region and the reaction region, and an outlet-side diffusion region between the outlet-side manifold region and the reaction region, and wherein the heights of the protrusions in the inlet-side diffusion region decrease in a direction from a first side of the reaction region to a second side of the reaction region.

* * * * *